United States Patent
Hannu (12) United States Patent (10) Patent No.: US 6,171,398 B1
Hannu (45) Date of Patent: Jan. 9, 2001

(54) APPARATUS FOR COATING A CONDUIT SURFACE

(76) Inventor: Donald W. Hannu, 3101 - 37th St, NW., Mandan, ND (US) 58554

(*) Notice: Under 35 U.S.C. 154(b), the term of this patent shall be extended for 0 days.

(21) Appl. No.: 09/290,135

(22) Filed: Apr. 12, 1999

(51) Int. Cl.$^7$ ........................................................ B05C 7/02
(52) U.S. Cl. ........................ 118/306; 118/317; 118/215; 118/254; 118/DIG. 10; 134/167 C; 134/168 C
(58) Field of Search .................................. 118/215, 254, 118/306, 317, 323, DIG. 10; 427/236, 230; 134/167 C, 168 C; 219/76.1, 76.15, 76.16

(56) References Cited

U.S. PATENT DOCUMENTS

| | | |
|---|---|---|
| 2,002,701 | 5/1935 | McWane . |
| 2,295,702 | 9/1942 | Wissler . |
| 2,461,517 | 2/1949 | Carnevale . |
| 2,478,711 | 8/1949 | Robinson et al. . |
| 2,818,083 | 12/1957 | Jelm . |
| 3,180,312 | 4/1965 | Handley et al. . |
| 3,606,862 | 9/1971 | Huff et al. . |
| 3,818,862 | 6/1974 | O'Brien et al. . |
| 4,165,245 | 8/1979 | Ludwig . |
| 4,178,875 | * 12/1979 | Moschetti ............................ 118/712 |
| 4,514,443 | 4/1985 | Kostecki . |
| 4,515,832 | 5/1985 | Roeder et al. . |
| 4,866,241 | 9/1989 | Doherty et al. . |
| 4,952,469 | 8/1990 | Acheson . |
| 4,959,110 | 9/1990 | Russell . |
| 5,185,183 | 2/1993 | Gonda et al. . |
| 5,298,710 | 3/1994 | Acheson et al. . |
| 5,539,177 | 7/1996 | Okuya et al. . |
| 5,707,693 | 1/1998 | Vliet et al. . |

* cited by examiner

*Primary Examiner*—Laura Edwards
(74) *Attorney, Agent, or Firm*—Dorr, Carson, Sloan & Birney, P.C.

(57) ABSTRACT

An apparatus for coating an interior surface of a conduit. The apparatus has a center rod with a substantially square cross-section that extends axially along the interior surface of the conduit. An index carriage slidably engages the substantially square cross-section of the center rod so that the index carriage maintains a fixed rotational orientation relative to the center rod. An index motor having a variable index position is carried by the index carriage. A coating device for coating the interior surface of the conduit is rotatably attached to the index carriage and connected to the index motor. As such, the coating device has an elevation position that corresponds to the index position of the index motor. A drive motor carried by a drive carriage propels the drive carriage longitudinally along the center rod. Generally, at least one intermediate carriage that slidably engages the substantially square cross-section of the center rod translates motion of the drive carriage to the index carriage so that the index carriage, and hence the coating device, moves longitudinally along the center rod.

20 Claims, 4 Drawing Sheets

APPARATUS FOR COATING A CONDUIT SURFACE

BACKGROUND OF THE INVENTION

1. Field of the Invention

The present invention relates generally to the field of apparatus for coating a conduit surface. More specifically, the present invention discloses an apparatus to accurately elevate a coating device to coat the inner surface of a conduit.

2. Statement of the Problem

Conduits are often used to carry fluids or abrasive slurries as part of a treatment or disposal process. As the fluid passes through the conduit, frictional forces against the conduit walls can cause the conduit walls to wear. The effect of these frictional forces is magnified on the curved portions of the conduit as a result of complex flow patterns and the forces from the fluid impacting the conduit surface caused by the fluid changing direction. Abrasives suspended within the fluid (e.g., solids commonly associated with mining slurries or sludge) can be even more detrimental to the conduit walls. Whatever the cause, these forces cause the conduit walls to wear even faster, eventually causing the conduit walls to crack or burst where the walls have worn thin.

To minimize the effects of these frictional forces on the conduit walls, a protective coating is applied (e.g., welded or sprayed) to the inner surface of the conduit. To provide effective protection against wear on the conduit wall, it is important that the entire area is completely coated with the coating material. Areas left unprotected will continue to be vulnerable to fracture.

An example of the prior art in this field is disclosed in U.S. Pat. No. 4,513,443 (Kostecki). Kostecki discloses an apparatus for coating an internal wall of a curved conduit with a layer of protective material. The apparatus has a guide means, a longitudinally flexible member, means for mounting a coating means for incremental rotation by the longitudinally flexible member, a drive means to drive the longitudinally flexible member relative to the curved conduit, and a means to automatically step the flexible member and consequently rotate the coating means. However, a disadvantage of using the flexible member in Kostecki is the associated inaccuracy in translating the rotational steps along the longitudinally flexible member. Because the coating means cannot be accurately rotated, the protective material can be misapplied resulting in either gaps or overlap between the applied strips of protective material.

A need exists to provide an apparatus to coat the internal walls of a conduit without sacrificing accuracy. In other words, conventional coating apparatus use a drive means remotely located from the coating device to elevate the coating device. As a result, error is introduced as the elevation drive is longitudinally translated from the remote position of the drive means. Consequently, portions of the conduit wall may be left unprotected. Alternately, in an attempt to eliminate unprotected surfaces, the spray pattern is severely overlapped, thus wasting the coating material.

3. Solution to the Problem

None of the prior art references uncovered in the search show an apparatus to coat a surface of a conduit having a center rod that provides for longitudinal movement of an index motor having a fixed rotational orientation relative to the center rod and positioned near a coating device so that the coating device is elevated directly proportionate to the index motor step to accurately coat the conduit wall. Therefore, the elevation of the coating device must be precisely controlled so that gaps are not formed between the strips of protective layer and to eliminate wasted coating material caused by overcorrecting, both potentially introduced by conventional coating apparatus.

SUMMARY OF THE INVENTION

The present invention is an apparatus for coating an interior surface of a conduit. The apparatus has a center rod with a substantially square cross-section that extends axially along the centerline of the conduit. An index carriage slidably engages the substantially square cross-section of the center rod, which ensures that the index carriage maintains a fixed rotational orientation relative to the center rod. An index motor is provided on the index carriage to elevate a coating device to coat the interior surface of the conduit. The coating device is rotationally attached to the index carriage and the index motor has an adjustable index position. Thus, as the index motor is indexed by a fixed angular increment, the coating device is rotated to a rotational position that corresponds to the index position of the index motor. A separate drive motor is carried by a drive carriage and propels the drive carriage longitudinally along the center rod. Generally, at least one intermediate carriage that slidably engages the substantially square cross-section of the center rod translates motion of the drive carriage to the index carriage so that the index carriage, and hence the coating device moves longitudinally along the center rod within the interior of the conduit. By positioning the index motor near the coating device and providing a center rod that moves the index carriage longitudinally while maintaining a fixed rotational profile, the rotational position of the coating device can be accurately controlled so that the entire interior surface of the coating device is coated without overlap or gaps in the coating.

A primary object of the present invention is to provide an apparatus to coat an internal surface or wall of a conduit with a layer of protective coating.

Another object of the present invention is to provide an index motor mounted near the coating device to reduce elevation errors such as those associated with the translational elevation changes from an index motor that is mounted remotely from the coating device. Thus, the coating device of the present invention can be accurately elevated so that the entire conduit wall is coated without undue overlap or gaps between applied strips of protective coating.

Yet another object of the present invention is to provide a substantially square center rod and carriages that can be moved or slid longitudinally parallel to the center rod without rotating about the center rod. As such, the present invention provides increased accuracy with which the coating device is elevated.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

1. Overview

Figure 1:
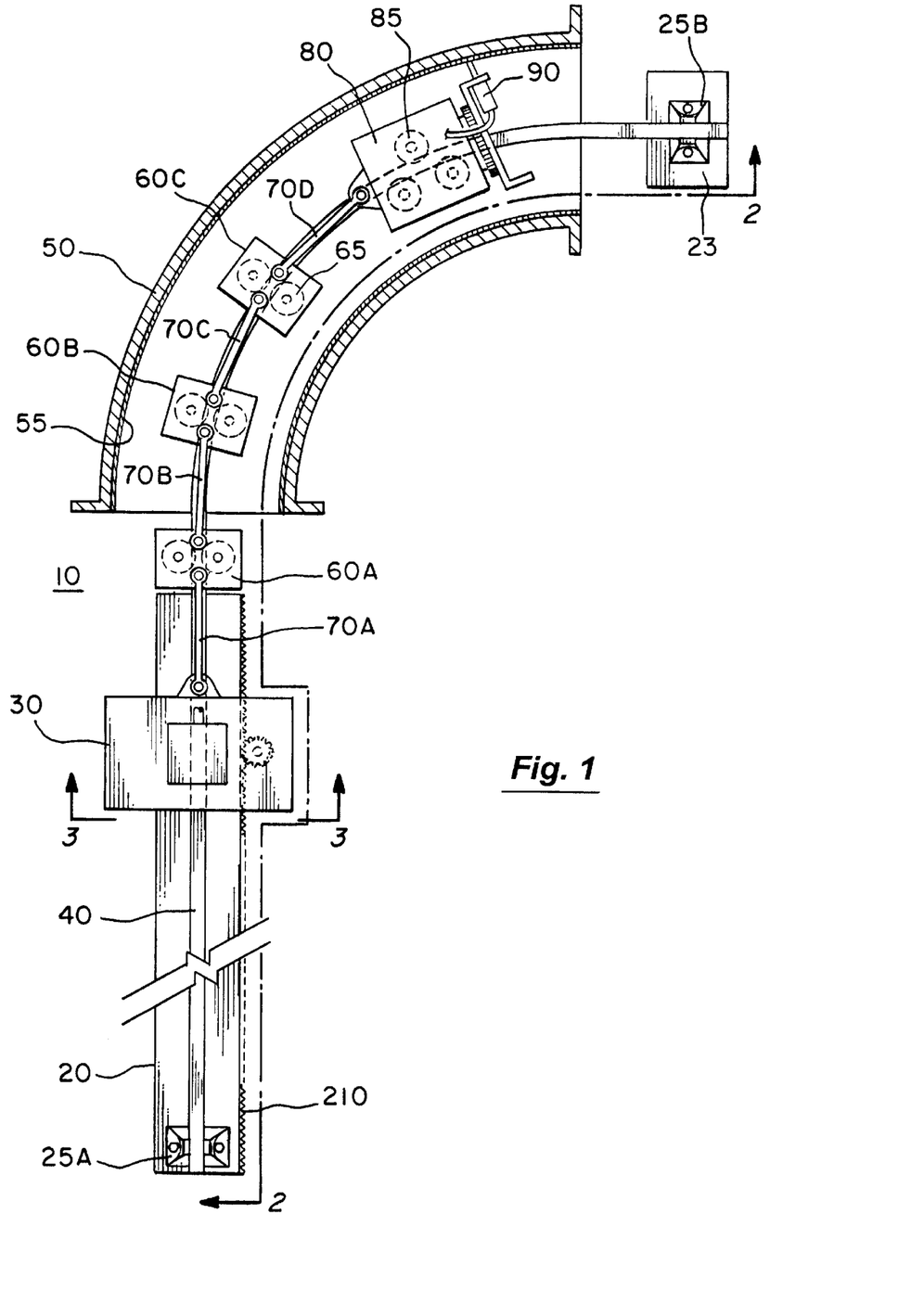
FIG. 1 is a top plan view of an apparatus of the present invention showing the conduit in cross-section.
Figure 2:
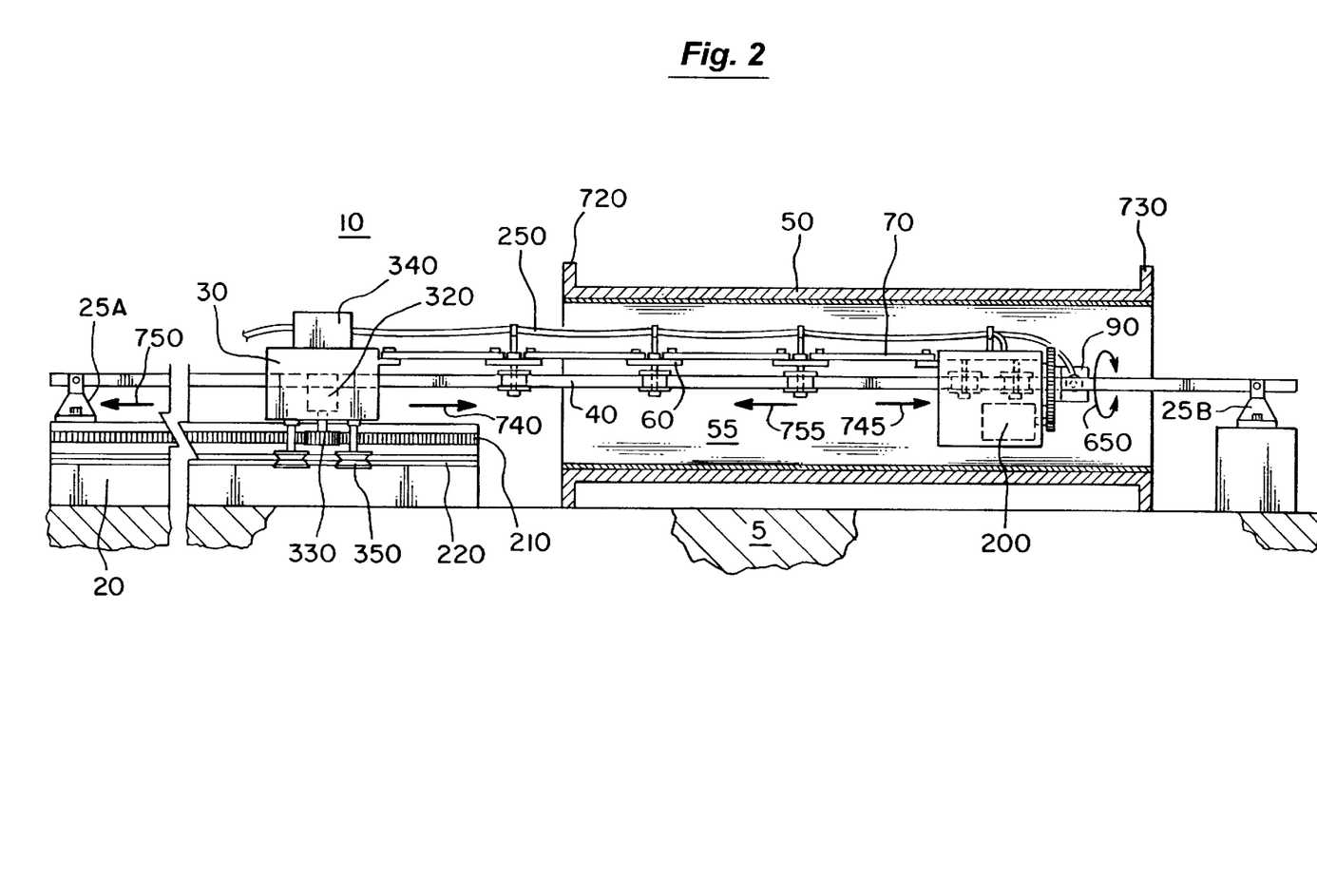
FIG. 2 is a side cross-sectional view of an apparatus of the present invention taken along lines 2—2 of FIG. 1.
Figure 5:
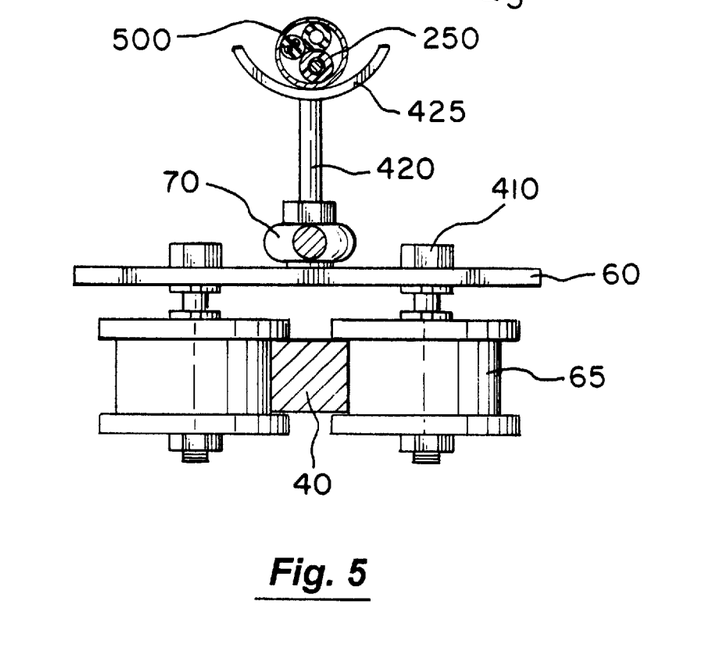
FIG. 5 is a front cross-sectional view of an intermediate carriage of the apparatus of the present invention taken along lines 5—5 of FIG. 4.

An apparatus 10 of the present invention is shown in FIGS. 1 and 2. A frame 20 supports a drive carriage 30 and a center rod 40. The center rod 40 extends along the length of the frame 20 and beyond the frame 20 above the floor 5 so that the center rod 40 can be extended through a conduit 50 along its centerline. In FIG. 1, three intermediate carriages 60A–C and an index carriage 80 are shown slidably engaging the center rod 40. The center rod 40 is shaped to provide support for the intermediate carriages 60A–C and the index carriage 80 so that each carriage travels longitudinally along the center rod 40 in a fixed orientation relative to the center rod 40. For example, the center rod 40 can have a square cross-section as shown in FIG. 5. The intermediate carriages 60A–C are connected to one another between the drive carriage 30 and the index carriage 80 with link arms 70A–D. A coating device 90 (e.g., a weld head, sprayer, nozzle, etc., or even a cleaning device such as a brush) is rotationally attached to the index carriage 80. Thus, when the drive carriage 30 is driven the length of the frame 20, as described in more detail below, the intermediate carriages 60A–C, and consequently the index carriage 80, slide along the center rod 40 axially through the conduit 50. As the index carriage 80 is moved along the center rod 40, the coating device 90 applies a strip of protective coating to the inner wall 55 of the conduit 50. As shown in FIG. 2, at the end of each longitudinal pass, an index motor 200 mounted to the index carriage 80 is then activated to rotate the coating device 90, as described in more detail below, and another strip of protective coating is applied to the inner wall 55 of the conduit 50 as the intermediate carriages 60A–C and the index carriage 80 are moved along the center rod 40 by the drive carriage 30.

2. Details of the Frame and Center Rod Support

The frame 20 (shown in FIGS. 1 and 2) supports the drive carriage 30 and the center rod 40. In the preferred embodiment, the frame 20 is a solid steel structure. However, any suitable frame 20 can be used under the teachings of the present invention, including a beam (e.g., a steel I-Beam), an A-frame assembly or any other solid or framed support assembly. Likewise, any suitable material (e.g., metal alloys, plastic composites, wood, a combination thereof, etc.) may be used so long as it provides the requisite strength to support the drive carriage 30 and the center rod 40.

The frame 20 is fitted with a rack gear 210. The rack gear 210 is preferably a rack gear mounted on at least one side or the top of the frame 20. The drive carriage 30 carries a drive motor 320. A pinion gear 330 is rotationally mounted to the drive motor 320 and engages the rack gear 210 of the frame 20. Thus, as the drive motor 320 is operated and the pinion gear 330 engages the rack gear 210 of the frame 20, the drive carriage 30 travels over the center rod 40 along the length of the frame 20. Although the rack gear 210 is preferably a gear to receive the teeth of the pinion gear 330, any suitable rack gear 210 could be used that allows the drive motor 320 to propel the drive carriage 30 along the length of the frame 20.

For example, a rubber strip could be used as long as enough friction could be generated so that a complimentary pinion gear 330 (e.g., with a rubber engaging surface) would engage the rack gear 210 and move the drive carriage 30 along the length of the frame 20 without slipping.

Figure 3:
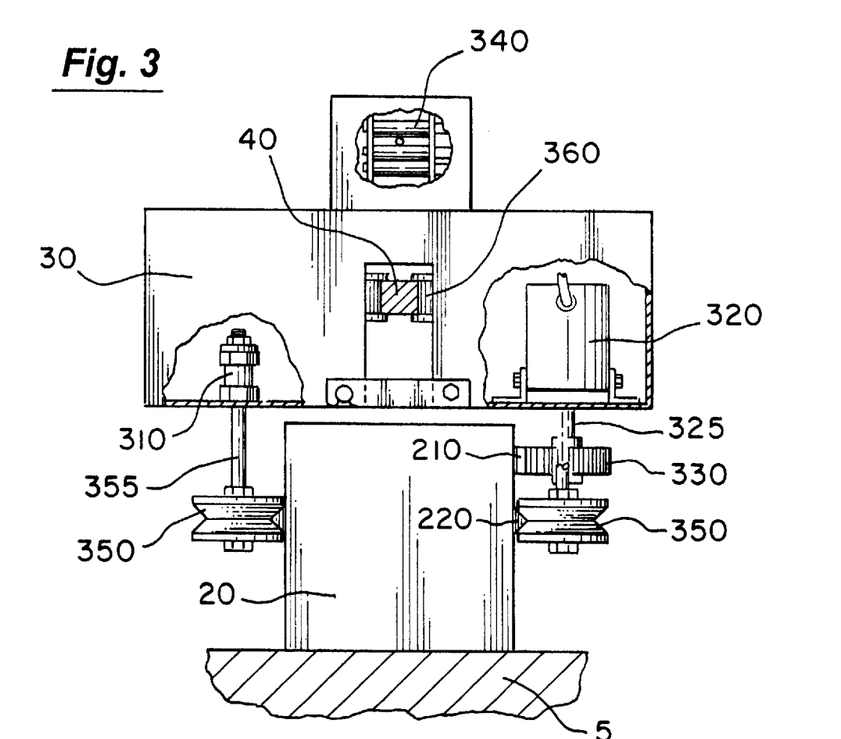
FIG. 3 is a front plan view of a drive carriage of the present invention taken along lines 3—3 of FIG. 1.

As shown in FIG. 2, a guide portion 220 can also be mounted to the frame 20. For example, the guide portion 220 can be a triangular railing formed on opposing sides of the frame 20, as shown in FIG. 3. The drive carriage 30 has a pair of guide wheels 350 rotationally attached on each side of the drive carriage 30. These guide wheels 350 are formed to compliment (e.g., inversely formed) the guide portion 220 of the frame 20 and thus slidably support the drive carriage 30 above the center rod 40. When the drive motor 320 propels the drive carriage 30 along the length of the frame 20, the drive carriage 30 is guided along the frame 20 by the guide wheels 350 engaging the guide portion 220.

The frame 20 is preferably straight and the rack gear 210 extends for a length at least equal to the length of the conduit 50 that is to be coated. Thus, the entire length of the conduit 50 that is to be coated can be coated when the drive carriage 30 travels the length of the rack gear 210. This arrangement allows the conduit 50 to remain stationary and instead the coating device 90 is moved through the conduit 50. However, it is to be expressly understood that the length and shape of the frame 20 can be shorter or longer depending on factors such as available space, average length when multiple conduits 50 are to be coated, expense, etc. In other embodiments, the conduit 50 will need to be moved after each section is coated to coat additional lengths of the conduit 50. Likewise, collapsible portions of the frame 20, extensions, etc. can be used to provide adjustable lengths of the frame 20.

The center rod 40 is preferably securely fastened above the frame 20 to a support bracket 25A mounted on the frame 20. The center rod 40 can also be fastened using a second support bracket 25B mounted above the floor 5 on a center rod support 23. However, for short distances, or if the center rod 40 is sufficiently rigid to support the weight of the intermediate carriages 60 and the index carriage 80, the second support bracket 25B and center rod support 23 can be omitted altogether. Although the center rod 40 shown in FIGS. 1 and 2 extends the length of the frame 20 so that the drive carriage 30 travels over the center rod 40, in another embodiment, the center rod 40 can be mounted at the end of the frame 20 closest to the conduit 50.

In the preferred embodiment, the center rod 40 has a substantially square cross-section. However, the center rod 40 can be rectangular, square with rounded corners, diamond-shaped, etc. It is only important that the intermediate carriages 60 and the index carriage 80 do not rotate relative to the center rod 40 (i.e., the carriages 60, 80 have a fixed rotational orientation relative to the center rod 40). Therefore, in other embodiments, the center rod 40 can be triangular, elliptical or even circular with a notch. For example, in an embodiment where the center rod 40 is circular with a notch, the intermediate carriages 60 and the index carriage 80 would be fitted with a complimentary key to prevent rotation about the center rod 40.

The frame 20 has been described as having a distinct rack gear 210 and guide portion 220, which are separate and distinct from the center rod 40. In this manner, the frame 20 supports the drive carriage 30, and the center rod 40 only provides support for the intermediate carriages 60 and the index carriage 80. However, it is to be expressly understood that these components need not be separate and distinct from one another, and that only their function and interaction with one another is important under the teachings of the present invention. For example, the rack gear 210 and guide portion 220 can be made separately from the frame 20 and attached thereto, or formed as part of the frame 20. The rack gear 210 can be formed to serve both the function of the rack gear 210 and the guide portion 220. Likewise, the rack gear 210 and the guide portion 220 need not be part of the frame 20, and can instead be integrated separately or in combination as part of the center rod 40. In another embodiment, the center rod 40 and the frame 20 (with its rack gear 210 and guide portion 220) can be combined to perform the same function as each component performs independently.

3. Details of the Drive Carriage

An embodiment of the drive carriage 30 is shown in more detail in FIG. 3. The drive carriage 30 supports a drive motor 320 connected to a pinion gear 330, a wire feed 340, and guide wheels 350. The drive motor 320 is fixedly attached to the drive carriage 30. A drive shaft 325 extends from the drive motor 320 to the drive or pinion gear 330 that engages the rack gear 210 of the frame 20. The drive carriage 30 is supported above the frame 20 preferably by opposing pairs of guide wheels 350 that serve to stabilize and guide the drive carriage 30 along the frame 20. The guide wheels 350 need not be provided in opposing pairs so long as the guide wheels 350 support the drive carriage 30 above the frame 20. For instance, a single guide wheel opposing one or more guide wheels can be used under the teachings of the present invention.

Optionally, center rod wheels 360 that engage the center rod 40 can also be used as an additional guide or in lieu of the guide wheels 350 and the guide portion 220. Thus, when the drive motor 320 is driven, the drive axle or shaft 325 rotates the pinion gear 330 which engages the rack gear 210 of the frame 20. The guide wheels 350 roll along the guide portion 220, moving the drive carriage 30 along the length of the frame 20.

As illustrated in FIG. 3, the wire feed 340 carries feed lines 250 that are required to operate the coating device 90. The feed lines 250 will vary depending on the use of the apparatus 10. For instance, when the apparatus 10 is used to coat the inside of conduit 50 with a welded layer of protective coating, the feed lines 250 can be electric wires, gas (e.g., butane, propane, etc.) lines, flux cable, etc. Likewise, if the apparatus 10 is used to clean the conduit 50, feed lines 250 can be hoses that supply water and cleaning solution to the coating device 90. Whatever the feed lines 250 are used with apparatus 10, the wire feed 340 serves to hold the feed lines 250 so that they do not interfere with the drive mechanism (i.e., pinion gear 330 and rack gear 210). Tubing 500 (e.g., such as is shown in FIG. 5) can also be used to carry multiple feed lines 250.

The drive carriage 30 is configured as a box, as shown in FIG. 3, to house the drive motor 320. However, in other embodiments, the drive carriage 30 can be a simple platform, frame structure, etc. In yet another embodiment, the drive carriage 30 can be configured with, for example, bearings and bearing races instead of the guide wheels 350 and the center rod wheels 360. The specific configuration of the drive carriage 30 is not important to the present invention. It is only important that the drive carriage 30 provide a mounting for the drive motor 320 so that the drive motor 320 can propel the drive carriage 30 along the length of the rack gear 210 of the frame 20.

4. Details of the Intermediate Carriages

Figure 4:
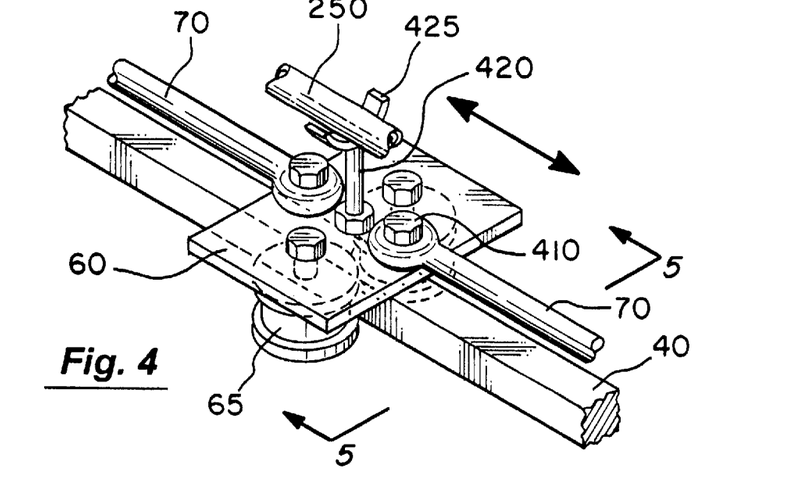
FIG. 4 is a perspective view of an intermediate carriage of the apparatus of the present invention.

An embodiment of the intermediate carriage 60 is shown in more detail in FIGS. 4 and 5. In FIG. 4, intermediate carriage 60 is configured as a plate that supports two opposing carriage wheels 65 rotationally mounted thereon. Each carriage wheel 65 is formed to roll along the center rod 40. Thus, in the preferred embodiment, when the center rod 40 is square, each carriage wheel 65 has a flat surface that rolls against the flat surface of the center rod 40, thus engaging the center rod 40 and guiding the intermediate carriage 60 longitudinally along the center rod 40 so that the intermediate carriage 60 maintains a fixed rotational orientation with respect to the center rod 40. In another embodiment in which the center rod 40 is, for example, diamond shaped, the carriage wheels 65 would be accordingly made so as to compliment the center rod 40. As such, the carriage wheels 65 stabilize the intermediate carriage 60 so that it maintains a fixed rotational orientation with respect to the center rod 40. That is, the intermediate carriage 60 does not rotate with respect to the center rod 40 and thus slides parallel and longitudinally to the center rod 40. Any number of carriage wheels 65 can be used under the teachings of the present invention. In other embodiments, the carriage wheels 65 may take any suitable form, such as bearings, rollers, etc., or even be a guide that slides within a slot formed on the center rod 40. The configuration of the carriage wheels 65 need only permit the intermediate carriage 60 to freely slide along the center rod 40 while maintaining a fixed rotational profile.

The intermediate carriage 60 is linked between the drive carriage 30 and the index carriage 80 by means of link arms 70. When more than one intermediate carriage 60 is used with the apparatus 10, each intermediate carriage 60 is similarly linked to one another using additional link arms 70 (e.g., link arms 70A–D shown in FIG. 1). The link arms 70 are pivotally connected to the intermediate carriage 60, the drive carriage 30, and the index carriage 80 using any suitable pivotal connection pin 410 (e.g., a bolt, a cotter pin assembly, etc.). In this manner, the intermediate carriages 60 and the index carriage 80 travel along the curved portion of the center rod 40 (e.g., as shown in FIG. 1), much like the cars of a freight or passenger train make turns along a curved portion of railroad track. The link arms 70 can be made longer or shorter depending on the degree of curvature in the center rod 40. In addition, while in the preferred embodiment, only a single link arm 70 is used between each carriage 30, 60, 70, multiple link arms 70 may be used between each or some carriages 30, 60, 80 for additional support. Likewise, similar design considerations will dictate the length of link arms 70, which can be uniform or vary in size. In other embodiments, link arms 70 can be omitted altogether, and the intermediate carriages linked directly to one another. It is only important that the intermediate carriages provide sufficient flexibility between the drive carriage 30 and the index carriage 80 so that the index carriage 80 can be moved along the curved portions of the center rod 40.

A support arm 420 for carrying feed lines 250 from the wire feed 340 on the drive carriage 30 to the coating device 90 on the index carriage 80 is also shown in FIGS. 4 and 5. Preferably, the support arm 420 has a semi-circular portion 425 on which the feed lines 250 are supported. Other suitable support arms 420 can be used under the teachings of the present invention, such as support arms 420 having a loop, a cylinder, a V-shaped support, a clamp, etc. It is only important that the support arm 420 retain the feed lines 250 so that the feed lines 250 do not become entangled and interfere with operation of the carriages 30, 60, 80.

Any number of intermediate carriages 60 can be used under the teachings of the present invention. In the preferred embodiment, the number of intermediate carriages 60 that are used will depend on a variety of factors including the length of the conduit 50 that is to be coated, the degree of curvature of the conduit 50, the support required for the feed lines 250, etc. For example, a very short length of straight conduit 50 will require fewer intermediate carriages 60 and in some embodiments, intermediate carriages 60 may not be needed at all. In other embodiments, such as when the apparatus 10 is used to coat a long stretch of conduit 50 having a severe curvature, a greater number of intermediate carriages 60 are required than when a short or relatively straight conduit 50 is used. Likewise, heavy feed lines 250 will require more intermediate carriages 60 to support the feed lines 250 above the center rod 40, whereas stiff or lightweight feed lines 250 will require fewer intermediate carriages 60. Other design parameters will dictate the number of intermediate carriages and the present invention is not to be limited by the number of intermediate carriages 60.

5. Details of the Index Carriage

Figure 6:
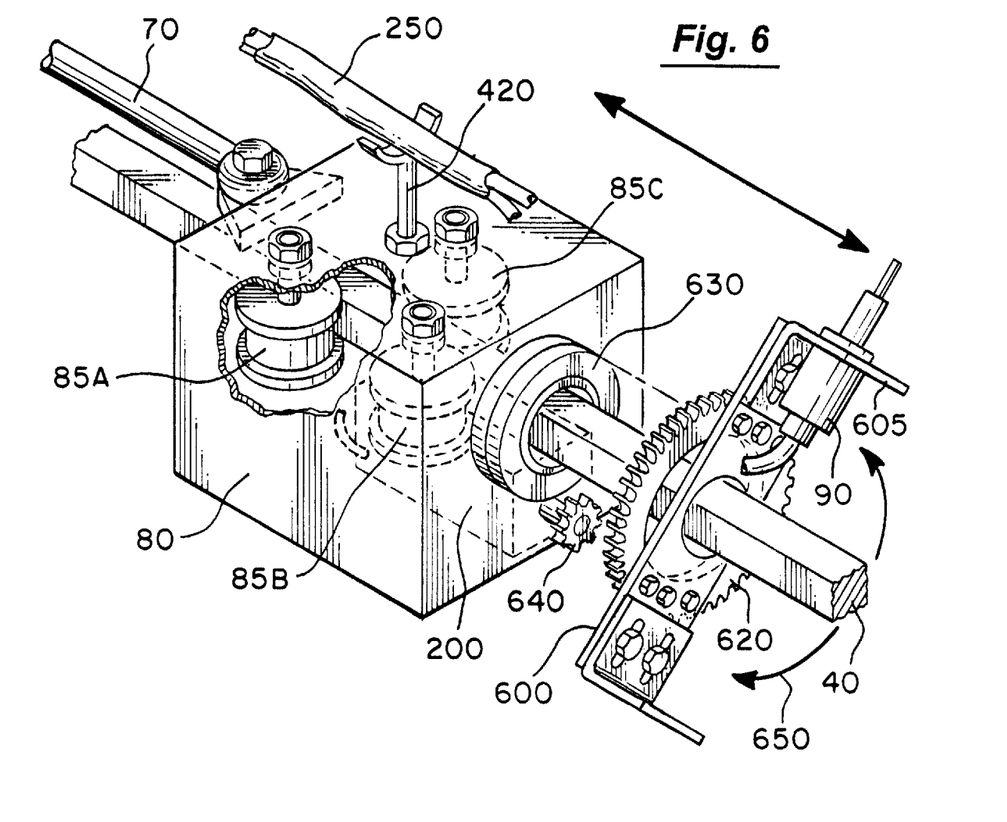
FIG. 6 is a perspective view of an index box of the apparatus of the present invention.

An embodiment of the index carriage 80 is shown in more detail in FIG. 6. The index carriage 80 preferably supports three index wheels 85A–C. Each index wheel 85 is rotationally attached to the index carriage 80, for example using any suitable wheel axle. The index wheels 85 are formed similarly to the carriage wheels 65, described above, in that each index wheel 85 rolls along the center rod 40 so that the index carriage 80 travels parallel and longitudinally to the center rod 40 without rotating relative to the center rod 40 (i.e., maintaining a fixed rotational profile relative to the center rod 40). The preferred embodiment as shown in FIG. 6, has two index wheels 85A,B triangularly opposing a third index wheel 85C. This configuration supports the index carriage 80 while permitting the index carriage 80 to readily travel along the curved portions of the center rod 40. However, other suitable configurations (e.g., those discussed for intermediate carriage 60) are applicable to the index wheels 85. A feed support 420 can also be mounted to the index carriage 80 to guide the feed lines 250 to the coating device 90.

The index carriage 80 also supports the index motor 200 which turns the index drive sprocket 640. The index drive sprocket 640 rotates the index gear 620 to which an index arm 600 is securely fastened. The coating device 90 is securely attached to the index arm 600 (e.g., with suitable angle irons 605). Thus, when the index motor 200 is driven, the index drive sprocket 640 rotates the index gear 620 and rotates the index arm 600 to rotate the coating device 90. The index motor 200 is preferably a conventional stepper motor that can be stepped a predetermined angular increment so that the coating device 90 is rotated (e.g., in the direction of arrow 650) and stopped at the desired angular position.

The index carriage 80 is shown in FIG. 6 configured as a housing that surrounds the index wheels 85, the index motor 200, and travels about the center rod 40. However, the index carriage 80 can be configured as a platform similar to the intermediate carriages 60, or a framed support structure that fits over the center rod 40, etc.

The preferred embodiment has thus been described with the apparatus 10 of the present invention including a drive carriage 30 to carry the drive motor 320, an index carriage 80 to carry the coating device 90, and intermediate carriages 60 interconnected with link arms 70 to translate motion from the drive carriage 30 to the index carriage 80. However, it is to be expressly understood that the drive motor 320 can be carried by the index carriage 80 itself, in which case, the drive carriage 30 and intermediate carriages 60 would not be needed. In such an embodiment, the center rod 40 is modified so that the drive motor 320 is able to directly propel the index carriage 80 along the center rod 40.

6. Operation

In operation, each of the above described components of the apparatus 10 preferably interact in the following manner, as shown in FIGS. 2 and 6. Typically, the drive carriage 30 will alternately move between a fully retracted position and a fully extended position. That is, when the drive carriage is in the fully retracted position, the drive carriage 30 is positioned near the support bracket 25A. When the drive carriage 30 is in the fully extended position, the drive carriage 30 is at the end of the frame 20 nearest the conduit 50. These positions are used merely for convenience in the following description, and in use, the drive carriage 30 can be positioned anywhere along the frame 20.

When the drive carriage 30 is in the fully retracted position, the index carriage 80, and hence the coating device 90 are positioned at the first end 720 of the conduit 50. The drive motor 320 is then driven so that the drive carriage 30 travels along the frame 20, as described above. As the drive carriage 30 travels (e.g., in the direction of arrow 740 in FIG. 2) along the frame 20, the drive carriage 30 pushes the intermediate carriages 60A–C (i.e., pushes link members 70A–D and consequently intermediate carriages 60A–C), which in turn push the index carriage 80 along the center rod 40 toward the second end 730 of the conduit 50 (e.g., in the direction of arrow 745 in FIG. 2). As the index carriage 80 is pushed along the center rod 40, the coating device is operated to apply a layer of protective coating longitudinally along a strip of the wall of the conduit 50. When the drive carriage 30 reaches the end of the frame 20 nearest the conduit 50 (i.e., the fully extended position) the drive carriage 30 is stopped, and the index motor 200 is stepped (e.g., in the direction of arrow 650) to rotate the coating device 90 so that the protective coating being applied by the coating device 90 is now being applied in a strip above or below and immediately adjacent to the strip of protective coating applied in the previous pass. The drive motor 320 is then reversed so that the drive carriage 30 now travels from the fully extended position back toward the fully retracted position. As the drive carriage 30 travels toward the fully retracted position, the drive carriage 30 pulls each intermediate carriage 60A–C (i.e., by pulling link members 70A–D) and the index carriage 80. As a result, the coating device 90 is again moved along the length of the conduit 50 so that a second layer immediately adjacent (or slightly overlapping) the first layer of protective coating is applied to the conduit wall 55. In this manner, the conduit wall 55 is accurately coated so that no part of the conduit wall 55 is left unprotected and any overlap between the strips of protective coating is the result of desired overlap instead of an attempt to correct for error in the rotational position of conventional coating apparatus.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described herein and above is further intended to explain the best mode presently known of practicing the invention and to enable others skilled in the art to utilize the invention as such, or in other embodiments, and with the various modifications required by their particular application or uses of the invention. It is intended that the appended claims be construed to include alternate embodiments to the extent permitted by the prior art.

I claim:

1. An apparatus for coating an interior surface of a conduit, said apparatus comprising:
    a center rod extending axially along the interior surface of the conduit;
    an index carriage slidably engaging said center rod and having a fixed rotational orientation relative to said center rod;
    an index motor carried by said index carriage, said index motor having an adjustable index position;
    a coating device for coating the interior surface of the conduit, said coating device rotatably attached to said index carriage and connected to said index motor, said coating device having a rotational position corresponding to said adjustable position of said index motor; and
    a drive motor translating said index carriage longitudinally along said center rod.

2. The apparatus of claim 1 further comprising a drive carriage to carry said drive motor, said drive motor propelling said drive carriage along a portion of said center rod.

3. The apparatus of claim 1 further comprising at least one intermediate carriage slidably engaging said center rod to translate motion from said drive motor to said index carriage so that said index carriage travels along said center rod.

4. The apparatus of claim 3 further comprising a plurality of link arms extending between said drive motor and said intermediate carriage and between said intermediate carriage and said index carriage, wherein said motion is translated from said drive motor to said index carriage through said plurality of link arms.

5. The apparatus of claim 1 further comprising a frame supporting said center rod.

6. The apparatus of claim 5 wherein said frame further comprises a rack gear engaged by said drive motor.

7. The apparatus of claim 5 wherein said frame further comprises a guide portion guiding said drive motor along said frame.

8. The apparatus of claim 1 wherein said center rod has a substantially square cross-section.

9. An apparatus for coating an internal surface of a conduit, said apparatus comprising:
    a drive carriage travelling between a retracted position and an extended position adjacent said conduit;
    a center rod extending through said conduit adjacent to said internal surface;
    an index carriage engaging said center rod and moving along the length of said center rod in response to said drive carriage travelling between said retracted position and said extended position, said index carriage maintaining a fixed rotational profile relative to said center rod;
    an index motor fixedly attached to said index carriage, said index motor having an adjustable index position;
    a coating device rotationally attached to said index carriage, said coating device travelling through said conduit as said index carriage moves along the length of said center rod, said coating device rotating when said index position of said index motor is adjusted, thereby applying adjacent layers of coating material to said internal surface of said conduit.

10. The apparatus of claim 9 further comprising at least one intermediate carriage slidably engaging said center rod, said intermediate carriage translating motion from said drive carriage to said index carriage so that said index carriage moves along said center rod.

11. The apparatus of claim 10 further comprising a plurality of link arms interconnecting said drive carriage to said intermediate carriage and interconnecting said intermediate carriage to said index carriage, wherein said motion is translated from said drive carriage through said intermediate carriage to said index carriage through said plurality of link arms.

12. The apparatus of claim 9 further comprising a frame to support said center rod.

13. The apparatus of claim 12 further comprising:
    a drive motor attached to said drive carriage;
    a rack gear attached to said frame, said drive motor engaging said rack gear to propel said drive carriage along the length of said frame; and
    a guide portion of said frame to guide said drive carriage along said frame.

14. The apparatus of claim 9 wherein:
    said drive carriage further has at least two opposing wheels rotationally mounted to said drive carriage so that said drive carriage maintains a fixed rotational profile relative to said center rod as said drive carriage travels along said center rod; and
    said index carriage further comprises a plurality of opposing index wheels rotationally mounted to said index carriage, said index wheels rotatably engaging said center rod so that said index carriage maintains a fixed rotational profile as said index carriage travels along said center rod.

15. An apparatus for coating an interior surface of a conduit, said apparatus comprising:
    a drive carriage;
    a drive motor for propelling said drive carriage between a retracted position and an extended position adjacent to said conduit;
    a center rod extending axially through said conduit, said center rod having a substantially square cross-section;
    an index carriage slidably engaging said substantially square cross-section of said center rod, said index carriage having a fixed rotational orientation relative to said center rod;
    at least one intermediate carriage connected between said drive carriage and said index carriage to translate the movement of said drive carriage between said retracted position and said extended position to said index carriage so that said index carriage moves longitudinally through said conduit;
    an index motor carried by said index carriage, said index motor having an adjustable index position;
    a coating device rotatably attached to said index carriage and connected to said index motor, said coating device rotatable by said index motor proportionate to said adjustments of said index position.

16. The apparatus of claim 15 further comprising a plurality of link arms interconnecting said drive carriage to said intermediate carriage and interconnecting said intermediate carriage to said index carriage, wherein said motion is translated from said drive carriage through said intermediate carriage to said index carriage through said plurality of link arms.

17. The apparatus of claim 15 further comprising a frame:
    a frame to support said center rod;
    a drive motor attached to said drive carriage;

a rack gear attached to said frame, said drive motor engaging said rack gear to propel said drive carriage along the length of said frame; and a guide portion of said frame to guide said drive carriage along said frame.

18. The apparatus of claim 15 further comprising a wire feed on said drive carriage and a support arm on said intermediate carriage.

19. The apparatus of claim 15 wherein drive carriage further has at least two opposing wheels rotationally mounted to said drive carriage so that said drive carriage maintains a fixed rotational profile relative to said center rod as said drive carriage slides longitudinally parallel to said center rod.

20. The apparatus of claim 15 wherein said index carriage further has at least three triangularly opposing index wheels rotationally mounted to said index carriage, said opposing index wheels slidably engaging said center rod so that said index carriage maintains a fixed rotational profile as said index carriage slides along said center rod.

* * * * *